M. J. DAVIS.
EGG CANDLING DEVICE.
APPLICATION FILED DEC. 15, 1916.
1,221,294.
Patented Apr. 3, 1917.
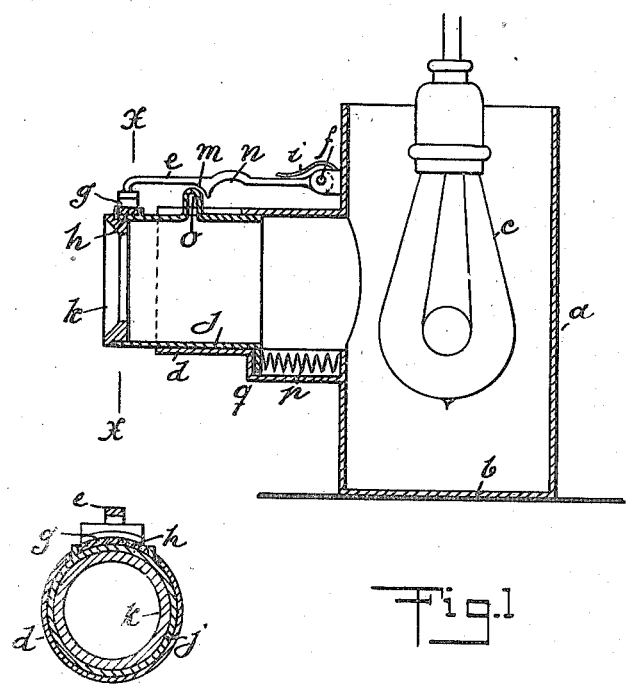
Fig.1
Fig.3
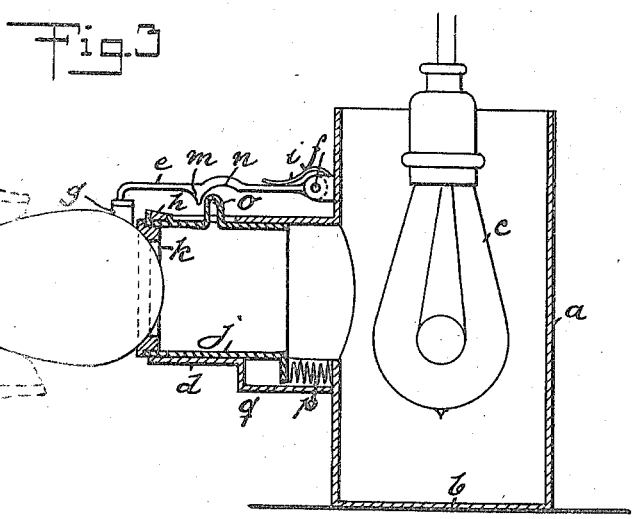
Fig.2
Inventor
Michael J. Davis
By his Attorney
Hauff & Sharland.

UNITED STATES PATENT OFFICE.

MICHAEL J. DAVIS, OF BROOKLYN, NEW YORK.

EGG-CANDLING DEVICE.

1,221,294.  Specification of Letters Patent.  Patented Apr. 3, 1917.

Application filed December 15, 1916. Serial No. 137,108.

*To all whom it may concern:*

Be it known that I, MICHAEL J. DAVIS, a citizen of the United States, residing at the city of Brooklyn, county of Kings, State of New York, have invented new and useful Improvements in Egg-Candling Devices, of which the following is a specification.

This invention relates to a device for testing eggs in which artificial light is utilized to observe the condition of the egg.

The present invention is designed to provide means associated with the tester for automatically stamping inscriptions on the shell of the egg which is inserted into an opening or peep hole of the device opposite to the light.

The main object of the invention is to provide the testing device with a simple and efficient printing device which is operated by the egg when placed into the peep hole to determine its translucency as evinced by the transmission of light placed near the egg.

The novel features of the invention are more fully described in the following specification and claims and illustrated in the accompanying drawing in which:

Figure 1 represents a vertical section of a device embodying this invention.

Fig. 2 is a similar view showing the parts in a different position.

Fig. 3 is a section taken along the line $x\ x$ of Fig. 1.

In this drawing is shown an egg candling device consisting of a cylinder $a$ having a bottom $b$ to form a compartment for an electric or other lamp $c$ preferably suspended into the compartment. A cylindrical member $d$ projects from the side of the compartment and forms a peep hole or opening whereby the egg can be observed by the aid of the light projected through the opening on to the egg.

The stamping or printing device includes an arm $e$ swingingly mounted at $f$ to the wall of the compartment. The forward portion of the arm is provided with rubber type $g$ glued or cemented to the lower portion of the arm for contact with the shell of an egg. The type can be concave or dished as indicated in Fig. 3 to correspond with the contour of the shell. An ink pad $h$ with a convex face engages the surface of the type as indicated in Fig. 1, when the egg is removed from the peep hole. A spring $i$ has a tendency to press the forward part of the arm $e$ on to the pad at predetermined times.

The ink pad is secured to a sleeve $j$ fitted into the forward portion of the opening. The sleeve can have depending cushions $k$ of felt or elastic to provide a seat for the egg and avoid any shock or fracture of the same when it is pushed into the opening. As shown in the drawing the arm is provided with a shoulder $m$ and a channel $n$, the shoulder being adapted when the egg is placed in the seat at the forward end of the sleeve and slightly pushed to coact with a projecting cam or rib formed on the sleeve. The arm $e$ is thereby swung upward by the movement of the sleeve to allow the pad to pass by the type. Then when the egg is pushed its normal distance into the opening the cam will engage the channel and the spring on the arm will force the forward end of the arm on to the surface of the egg to produce the inscriptions. The sleeve $j$ is restored to its normal position when the egg is removed by a spring $p$ arranged in a casing $q$ at the lower portion of the cylinder forming the peep opening.

Modifications of the invention may be made within the scope of the claims and the law of equivalents for example the pad and stamp can be connected to the cylinder and the stamp operated by the sliding movement of the sleeve, in this construction the stamp can be in the form of a strip of elastic and the arm omitted.

I claim:

1. The combination with an egg testing device, of means for printing inscriptions on the egg.

2. The combination with an egg candling device, of means mounted on the device for stamping inscriptions on the egg.

3. In an egg candling device, the combination with a peep hole for inserting an egg, of means coacting with the hole for stamping inscriptions on the egg.

4. In an egg candling device, the combination with a cylindrical member having a peep opening for inserting an egg, and a swinging arm operated by the egg for stamping inscriptions thereon.

5. In an egg candling device, the combination with a cylindrical member having a peep opening for the insertion of an egg, a slide provided with an ink pad normally coacting with the member, and a swinging arm mounted on the device normally engaging the pad for stamping inscriptions on the egg.

6. In an egg candling device, the combination with a cylindrical member having a peep opening for the insertion of an egg, a slide provided with an ink pad arranged in the member, a swinging arm mounted on the device normally engaging the pad, and means carried by the slide for actuating the arm to stamp inscriptions on the egg.

In testimony whereof I have hereunto set my hand in the presence of two subscribing witnesses.

MICHAEL J. DAVIS.

Witnesses:
GRACE DE VOE,
WILLIAM MILLER.